United States Patent

Belcher et al.

[11] Patent Number: 5,995,046
[45] Date of Patent: Nov. 30, 1999

[54] RADIO GEO-LOCATION SYSTEM WITH ADVANCED FIRST RECEIVED WAVEFRONT ARRIVAL DETERMINATION

[75] Inventors: Donald K. Belcher, Rogersville; Robert W. Boyd, Eidson; Michael A. Wohl, Rogersville, all of Tenn.

[73] Assignee: Widata Corporation, Rogersville, Tenn.

[21] Appl. No.: 09/239,399

[22] Filed: Jan. 28, 1999

Related U.S. Application Data

[60] Provisional application No. 60/073,254, Jan. 30, 1998.

[51] Int. Cl.$^6$ .................................................... G01S 3/02
[52] U.S. Cl. ......................... 342/450; 342/463; 342/465; 375/200
[58] Field of Search .................................. 342/450, 463, 342/465; 375/200

[56] References Cited

U.S. PATENT DOCUMENTS

| | | | |
|---|---|---|---|
| 5,119,104 | 6/1992 | Heller | 342/450 |
| 5,420,883 | 5/1995 | Swensen et al. | 375/200 |
| 5,742,035 | 4/1998 | Sanderford, Jr. | 375/200 |
| 5,920,287 | 7/1999 | Belcher et al. | 342/450 |

*Primary Examiner*—Mark Hellner
*Attorney, Agent, or Firm*—Charles E. Wands

[57] ABSTRACT

An asset management radio location system uses time-of-arrival differentiation for random and repetitive spread spectrum, short duration pulse 'blinks' from object-attached tags, to provide a practical, continuous identification of the location of each and every object within an environment of interest, irrespective whether the object is stationary or moving. Correlation-based RF processors determine which signals received spatially diverse antennas coupled to tag transmission readers are first-to-arrive signals as transmitted from any blinking tag. An object location processor carries out time-of-arrival differentiation of first-to-arrive transmissions from any blinking tag to determine where the respective object is located within the environment.

12 Claims, 9 Drawing Sheets

RADIO GEO-LOCATION SYSTEM WITH ADVANCED FIRST RECEIVED WAVEFRONT ARRIVAL DETERMINATION

CROSS-REFERENCE TO RELATED APPLICATIONS

The present application relates to co-pending U.S. Provisional Patent Application Ser. No. 60/073,254, filed Jan. 30, 1998, by Donald K. Belcher et al, entitled: "Radio Geo-location Technique with Advanced First Wave-Front Arrival Determination," and is a continuation-in-part of co-pending U.S. Non-Provisional Patent Application Ser. No. 08/786,232, filed Jan. 21, 1997, by Donald K. Belcher et al, entitled "Radio Location System for Precisely Tracking Objects by RF Transceiver Tags Which Randomly and Repetitively Emit Wideband Identification Signals," (hereinafter referred to as the '232 application), each application being assigned to the assignee of the present application and the disclosures of which are incorporated herein.

FIELD OF THE INVENTION

The present invention relates in general to object location and tracking systems, and is especially useful in object tracking applications, such as asset management systems, where continuous identification of the locations of various objects is desired. In particular, the invention is directed to an RF energy-based object tracking system, that employs spatial diversity based first wave-front arrival determination and matched filter correlation processing of direct spread spectrum signals emitted by tagged objects, to accurately identify a first-to-arrive RF signal burst from a tag, and a multi-lateration algorithm for precisely identifying the locations of objects. Each object is 'tagged' with a micro-miniaturized radio transmitter unit, that repetitively and randomly 'blinks' or transmits a spread spectrum RF signal, that is encoded with information representative of the identification of the object and auxiliary parameter data, such as that provided by an external sensor.

BACKGROUND OF THE INVENTION

As described in the introductory portion of the above-referenced '232 application, one proposal for tracking (the movement of) objects in a multipath environment (such as a semiconductor manufacturing facility), is a motion-based system described of the U.S. Pat. No. 5,119,104 to Heller, entitled: "Location System Adapted for Use in Multipath Environments." In accordance with this patented scheme, objects (e.g., semiconductor wafer boxes) are 'tagged' with micro-miniaturized radio TAG transmitters. These transmitters are normally in a power-save or quiescent mode, until triggered by associated motion sensors. When the object (wafer box) is moved, however, a motion sensor initiates a transmit mode of operation of the TAG, causing the TAG's transmitter to emit an RF signal that is encoded with the identification of the tag. As long as the object/box is moving, its tag continues to transmit.

Using multi-lateration receivers that are distributed throughout the monitored area of interest, and are referenced to a common time base for time-of-arrival processing, the location of a respective TAG and its associated box can be tracked (as the box is being moved), up to the point where it is at rest at the next downstream station. The TAG then reverts to quiescent mode, with transmission disabled until the box is again moved.

One of the principal shortcomings of the motion-dependent object tracking system proposed in the Heller patent is the fact that, in addition to being motion-dependent, and contrary to what the patent alleges, the disclosed system does not effectively solve the problem of multipath inputs to its tracking receiver subsystem. This latter shortcoming is due to the fact that its receivers are relatively simple amplitude detection devices that operate on the premise that the strongest signal is the first-to-arrive signal. This means that the Heller approach will erroneously identify a later arriving, relatively large amplitude, multipath signal (such as one that may have passed through an open window and reflected off a highly reflective surface (e.g., a nearby water tower) without significant attenuation, over a relatively weak, but first-to-arrive signal, that has travelled in a direct path from the TAG to the receiver, but has had to pass through an attenuating medium (such as a wall) to reach the receiver.

A further shortcoming of the object tracking system proposed in the Heller patent is the fact that it is not concerned with the more fundamental problem of asset management. Asset management not only addresses the need to locate and track processed components in the course of their travel through a manufacturing and assembly sequence, but is also concerned with the more general problem of component and equipment inventory control, where continuous knowledge of the whereabouts of any and all assets of a business, factory, educational, military or recreational facility, and the like, is desired and/or required. An asset management system may also benefit from status information that can be provided to the tag, by means of an auxiliary sensor associated with the tag—something not address by the Heller scheme.

Figure 1:
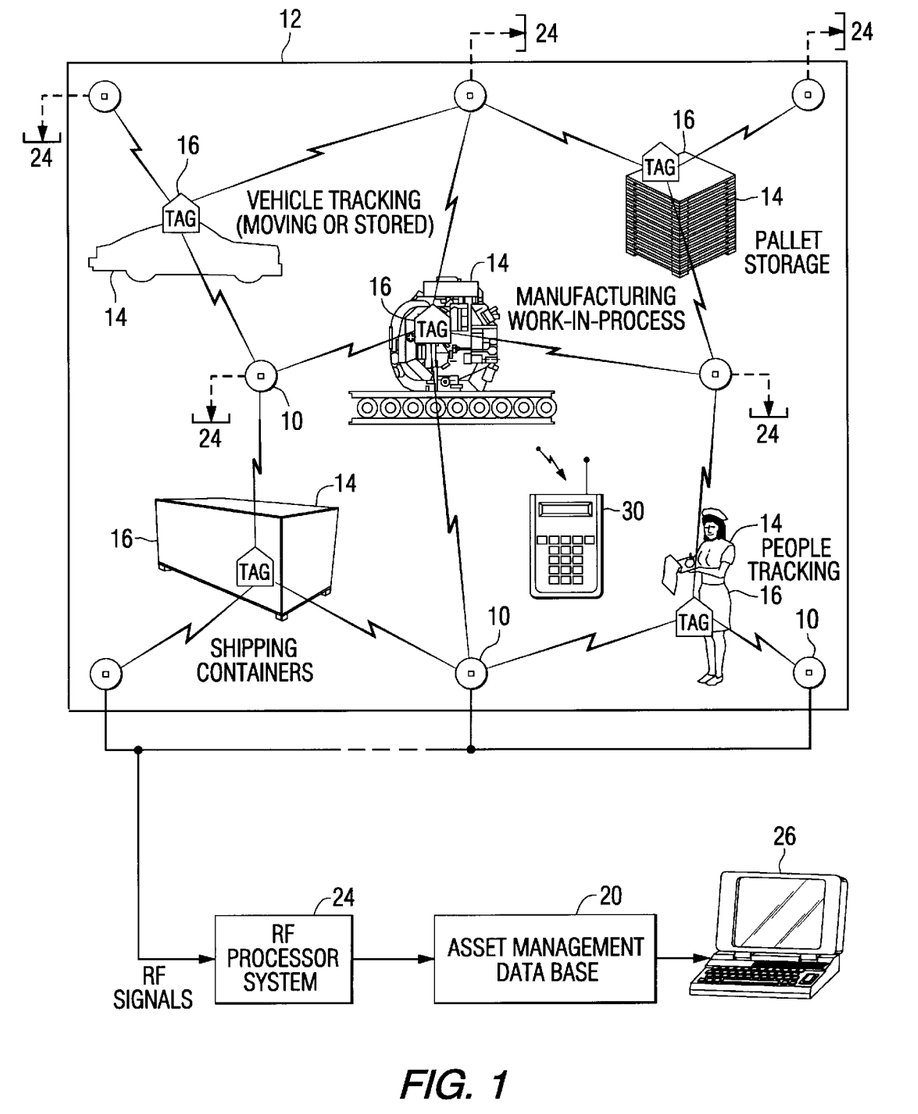
FIG. 1 diagrammatically illustrates the general architecture of a tagged object tracking and location system detailed in the '232 application.

In accordance with the system described in the above-referenced '232 application, the deficiencies of a conventional system, such as that proposed in the Heller patent, are remedied by a tagged object geolocation system having the general architecture illustrated in FIG. 1. As shown therein a plurality of tag emission readers 10 are geographically distributed within and/or around an asset management environment 12. This environment contains a plurality of objects/assets 14, whose locations are to be monitored on a continuous basis and reported to an asset management data base 20. The data base 20 is accessible by way of a standard computer workstation or personal computer, as shown at 26. Each of the readers 10 monitors the asset management environment for emissions from one or more randomly transmitting tags 16 each of which is affixed to an object to be tracked.

A respective tag 16 transmits or 'blinks' a very short duration, wideband (spread spectrum) pulse of RF energy. This pulse is encoded with information, such as that representative of the identification of the object, and other object-associated information stored in memory. As a non-limiting example, in the case where the object is a perishable, high value product, such as wine, drugs or other temperature sensitive material, such associated status information may comprise temperature data supplied by a temperature sensor installed within or external to the tag. Each tag 16 repeatedly transmits a spread spectrum encoded RF signal in a random manner, so that, from an RF observation standpoint, a plurality of such tagged objects within the monitored environment may be considered akin to the random 'blinking' of a field of fireflies.

As a non-limiting example, the monitored environment 12 may correspond to an electronic system engineering and testing facility, in which the assets/objects 14 to be tracked include various types of design, measuring and testing equipment, such as personal computers, personal digital assistants, signal generators, oscilloscopes, and the like, that are available for use by engineering and other technical personnel in the course of the design, testing and manufacture and assembly of the components of an electronic signal processing system.

The tag emission readers 10 (to be described below with reference to FIG. 5), may be installed at relatively unobtrusive locations within and/or around the perimeter of the environment, such as doorway jams, ceiling support structures, etc. Each tag reader 10 is coupled to an associated reader output processor of an RF processing system 24, which is operative to correlate the spread spectrum signals received from a tag with a set of spread spectrum reference signal patterns, and thereby determine which spread spectrum signals received by the reader is a first-to-arrive spread spectrum signal burst transmitted from the tag.

The first-to-arrive signals extracted by the reader output processor from the signals supplied from a plurality of readers 10 are coupled to an object location processor, within processing system 24. The object location processor is operative to execute time-of-arrival differentiation of the detected first-to-arrive transmissions, and thereby locate (within a prescribed spatial resolution (e.g., on the order of ten feet) the tagged object of interest.

In order for the asset management database 20 to have a practical benefit, such as providing an indication of the effective utilization (percent usage per unit time) of the objects (e.g., equipment) being tracked, it is desirable that the location and other relevant parameter data associated with each object and stored in the database be updated at some reasonable repetition rate or frequency, thereby enabling plant supervisory personnel to make reasonably fully informed decisions with respect to the disposition and usage of the objects.

To satisfy this objective and minimize battery power consumption, each RF pulse autonomously emitted by a respective tag has a very short (e.g., 100 millisecond) duration, wide bandwidth (spread spectrum) pulse, whose repetition rate varies with the application (from tens of seconds to several hours, for example). The interval between pulses and the number of tags used in a particular application are selected to minimize the probability of collisions (two or more tags transmitting at the same time). Though highly unlikely, should a collision occur, due to the random retransmission times, there is a high degree of certainty that information from the tags whose transmissions have collided will be received at the tag's next transmission time, so that the system database will be updated at a rate covering no more than two transmission intervals.

The net result of each tag emission being of short duration and repeated with relatively long intervals between bursts is that the tag's transmitter spends most of its time in a powered down mode, yet does not go extended periods of time without 'blinking'.

Figures 2, 3:
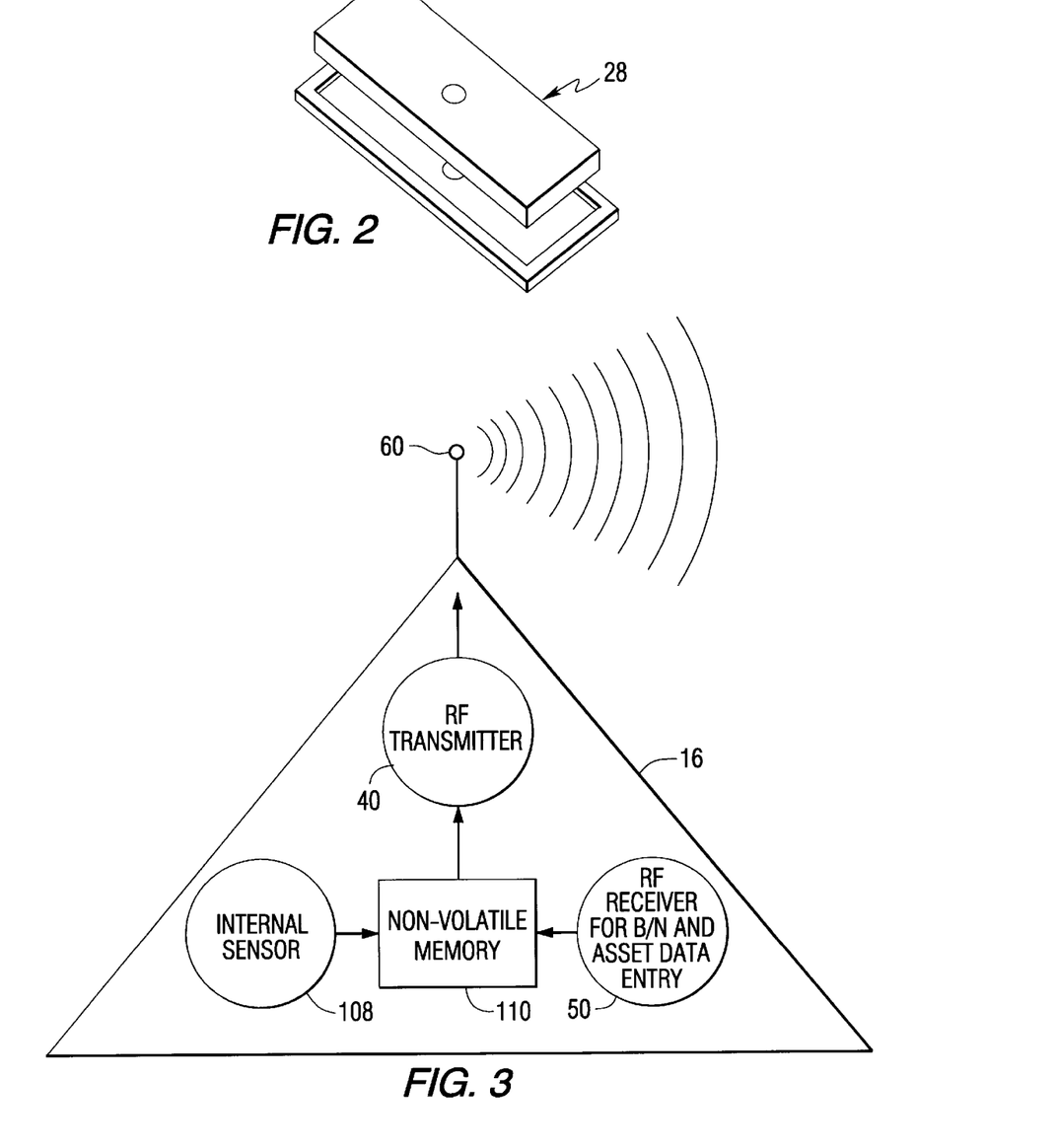
FIG. 2 is an exploded perspective view of a module for housing tag circuitry and affixable to an object to be tracked by the system of FIG. 1.
FIG. 3 is a general functional diagram of a tag transceiver unit employed in the radio location and tracking system FIG. 1.

As diagrammatically illustrated in exploded perspective view of FIG. 2, the circuitry of a respective tag may be housed in a relatively compact, sealed transceiver module 28, which is sized to accommodate installation of a transceiver chip and one or more relatively long-life, flat-pack batteries and sensor devices. As a non-limiting example, the module may be rectangularly shaped, having a volume on the order of slightly more than one cubic inch, which allows the tag to be readily affixed to a variety of objects to be tracked.

Figure 4:
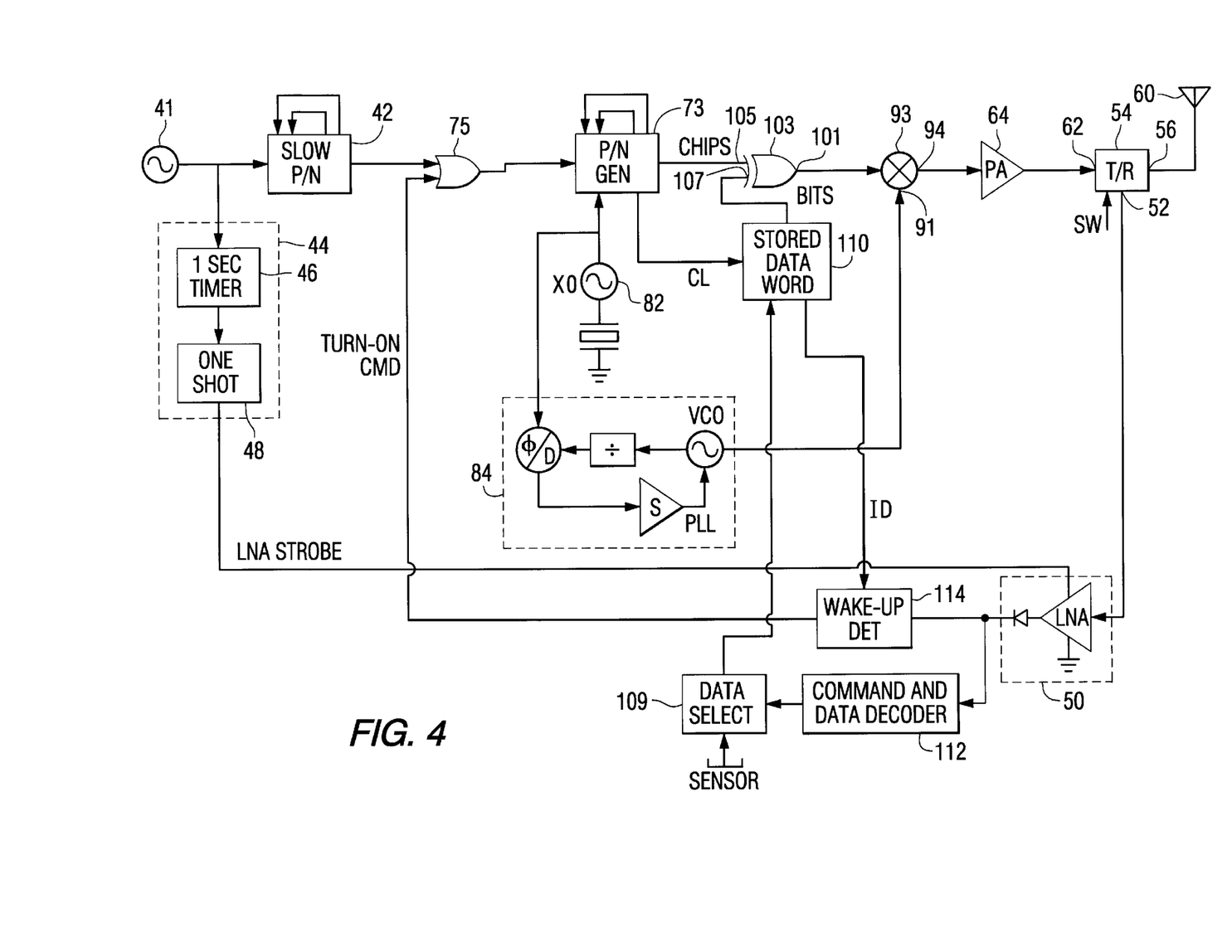
FIG. 4 shows the circuitry architecture of the tag transceiver unit of FIG. 3.

The general functional architecture of a tag transceiver (transmitter-transponder) unit employed in the radio location and tracking system of FIG. 1 is diagrammatically illustrated in FIG. 3 and the circuit components thereof are shown in detail in FIG. 4. For sourcing signals to be transmitted by an RF transmitter section 40, the tag transceiver may comprise a relatively coarse oscillator 41, whose output is fed to a first 'slow' pseudo random pulse generator 42 and to a strobe pulse generator 44. As a non-limiting example, oscillator 41 may be implemented by means of a relatively inexpensive RC oscillator, which is sensitive to environmental parameter (e.g., temperature) variations and thus further minimizes the likelihood that any two tags will transmit simultaneously.

The strobe generator 44 includes a timer 46 having a prescribed time-out duration (e.g., one-second) and a (one-shot) delay circuit 48, the output of which is a low energy (e.g., several microamps) receiver enable pulse having a prescribed duration (e.g., one-second wide). This pulse is used to controllably enable or strobe a relatively short range receiver 50, such as a crystal video detector, which requires a very insubstantial amount of power compared to other components of the tag. Because the receiver enable pulse is very low power, it does not effectively affect the tag's battery life.

The duration of the receiver enable pulse produced by the strobe pulse generator 42 is defined to ensure that any low power interrogation or query signal generated by a transceiver, such as a battery-powered, portable interrogation unit, to be described, will be detected by the crystal video receiver 50. As a relatively non-complex, low power device, crystal video receiver 50 is responsive to queries only when the interrogating unit is relatively close to the tag (e.g., on the order of ten to fifteen feet). This prevents an interrogator wand (to be described) from stimulating responses from a large number of tags. Signal strength measurement circuitry within the interrogator wand may be used to provide an indication of the proximity of the queried tag relative to the location of the wand.

In order to receive interrogation signals from the interrogating unit, the receiver 50 has its input coupled to a receive port 52 of a transmit—receive switch 54, a bidirectional RF port 56 of which is coupled to an antenna 60. Transmit—receive switch 54 has a transmit port 62 thereof coupled to the output of an RF power amplifier 64, that is powered up only during the relatively infrequent transmit mode of operation of the tag, as will be described.

The output of the 'slow' pseudo random pulse generator 42 is a series of relatively low repetition rate (for example, from tens of seconds to several hours) randomly occurring pulses or 'blinks' that are coupled to a high speed PN spreading sequence generator 73 via an OR gate 75. These blinks/pulses define when the tag will randomly transmit or 'blink' bursts of wideband (spread spectrum) RF energy to be detected by the system readers, in order to locate and identify the tag using time-of-arrival geometry processing of the identified first-to-arrive signals, as described above.

In response to an enabling 'blink' pulse, the high speed PN spreading sequence generator 73 generates a prescribed spreading sequence of PN chips. The PN spreading sequence generator 73 is driven at the RF frequency output of a crystal oscillator 82. This crystal oscillator provides a reference frequency for a phase locked loop (PLL) 84, which establishes a prescribed output frequency (for example a frequency of 2.4 GHz, to comply with FCC licensing rules). The RF output of the PLL 84 is coupled to a first input 91 of a mixer 93, the output 94 of which is coupled to the RF power amplifier 64. Mixer 93 has a second input 95 coupled to the output 101 of a spreading sequence modulation exclusive-OR gate 103. A first input 105 of exclusive-OR gate 101 is coupled to receive the PN spreading chip sequence generated by PN generator 73. A second input 107 of OR gate 101 is coupled to receive the respective bits of data stored in a tag data storage memory 110, which are clocked out by the PN spreading sequence generator 73.

As a non-limiting example, the tag memory 110 may comprise a relatively low power, electrically alterable CMOS memory circuit, which serves to store a multibit word or code representative of the identification of the tag. Memory circuit 110 may also store additional parameter data, such as that provided by an associated sensor (e.g., a temperature sensor) 108 that is installed on or external to the tag, and coupled thereto by way of a data select logic circuit 109. The data select logic circuit 109 is further coupled to receive data that is transmitted to the tag by means of an interrogation message from an interrogating unit, as decoded by a command and data decoder 112, which is coupled in circuit with the output of crystal video receiver 50.

The data select logic circuit 109 is preferably implemented in gate array logic and is operative to append any data received from a wand query or an external sensor to that already stored in memory 110. In addition, it may selectively couple sensor data to memory, so that the tag will send only previously stored data. It may also selectively filter or modify data output by the command and data decoder 112, as received from an interrogating wand.

When a query transmission from an interrogation wand 30 is detected, the tag's identification code stored in memory 110 is coupled to a 'wake-up' comparator 114. Comparator 114 compares the tag identification bit contents of a received interrogation message with the stored tag identification code. If the two codes match, indicating receipt of a wand query message to that particular tag, comparator 114 generates an output signal. This output signal is used to cause any data contained in a query message to be decoded by command and data decoder 112, and written into the tag memory 110 via data select logic circuit 109. The output of comparator 114 is coupled through OR gate 75 to the enable input of PN generator 73, so that the tag's transmitter will generate a response RF burst, in the same manner as it randomly and repeatedly 'blinks' a PN spreading sequence transmission containing its identification code and any parameter data stored in memory 110, as described above.

Figure 5:
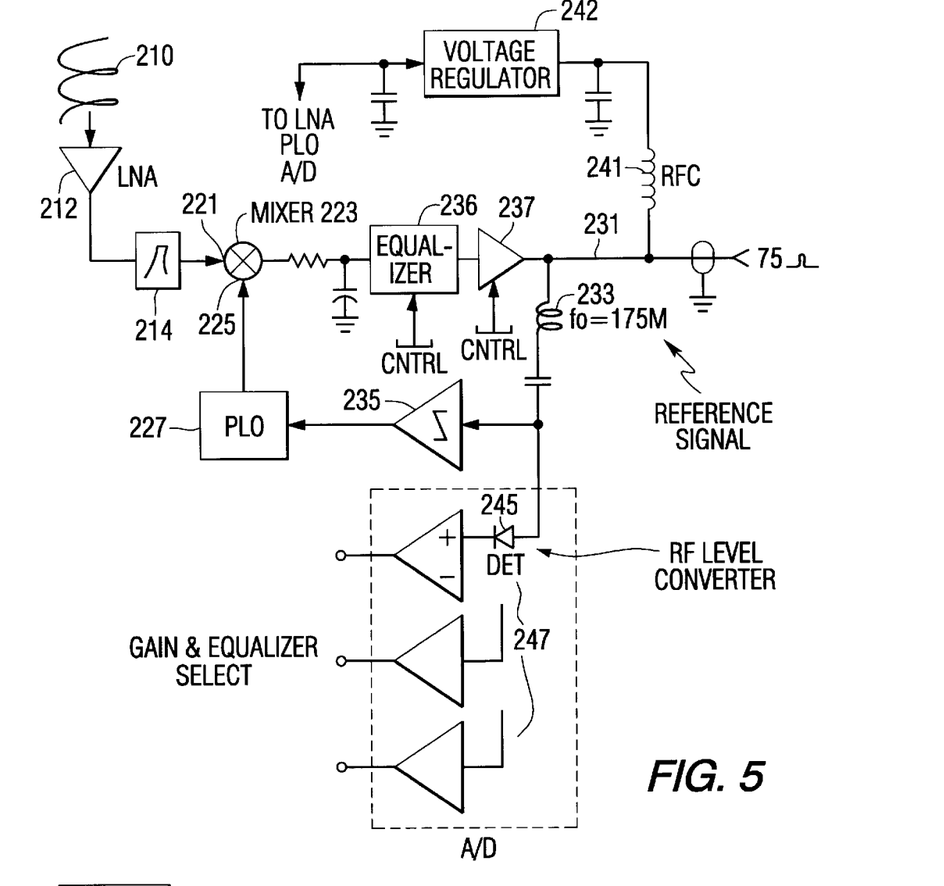
FIG. 5 diagrammatically illustrates the circuitry configuration of a respective tag reader.

FIG. 5 diagrammatically illustrates the circuitry configuration of a respective tag reader. Each reader includes an antenna 210 for sensing transmission bursts from a respective tag. The reader antenna, which is preferably omnidirectional and circularly polarized, is coupled to a power amplifier 212, whose output is filtered by a bandpass filter 214. Respective I and Q channels of the bandpass filtered signal are processed in associated circuits corresponding to that coupled downstream of filter 214. To simplify the drawing only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and applied to communication cable 231 to the communication signal processor. The communication cable 231 also supplies DC power for the various components of the reader by way of an RF choke 241 to a voltage regulator 242, which supplies the requisite DC voltage for powering the oscillator, power amplifier and analog-to-digital units of the reader.

The amplitude of the (175 MHZ) reference frequency supplied by the communications control processor to the phase locked local oscillator 227 implies the length of the communication cable 231 between the processor and the reader. This magnitude information can be used as control inputs to equalizer 236 and current amplifier 237, so as to set gain and/or a desired value of equalization, that may be required to accommodate the length of the communication cable. For this purpose, the magnitude of the reference frequency may be detected by a simple diode detector 245 and applied to respective inputs of a set of gain and equalization comparators shown at 247. The outputs of comparators are quantized to set the gain and/or equalization parameters.

Figure 6:
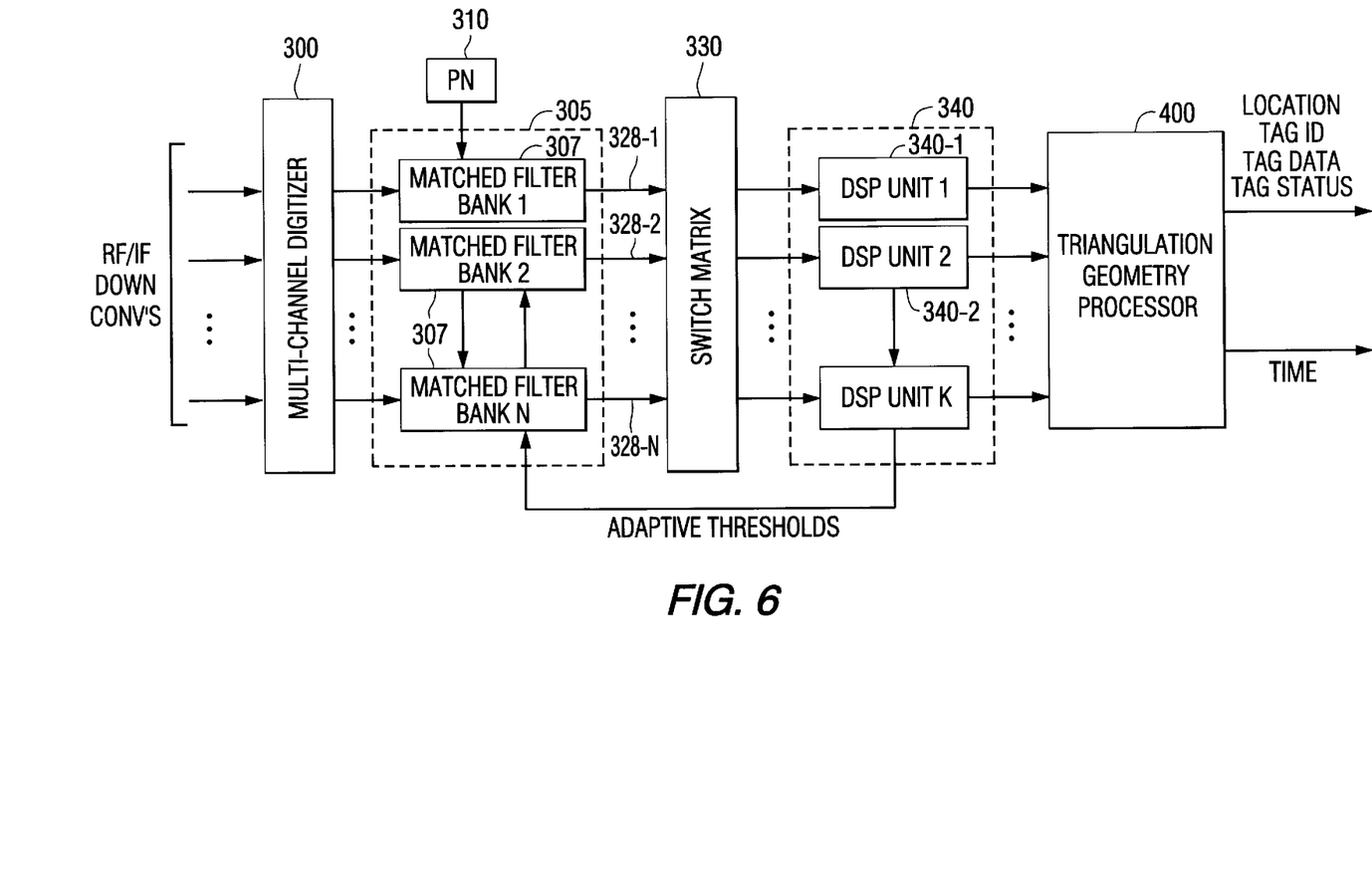
FIG. 6 diagrammatically illustrates the architecture of a correlation-based, RF signal processor to which the output of a respective RF/IF conversion unit of a tag reader is coupled.

FIG. 6 diagrammatically illustrates the architecture of a correlation-based, RF signal processor to which the output of a respective RF/IF conversion unit of FIG. 5 is coupled. The correlation-based RF signal processor correlates spread spectrum signals detected by its associated reader with successively delayed or offset in time (by a fraction of a chip) spread spectrum reference signal patterns, and determines which spread spectrum signal received by the reader is the first-to-arrive—corresponding to the blink from the tag that has travelled over the closest observable path between the tag and the reader.

Because each reader can be expected to receive multiple signals from the tag, due to multipath effects caused by the signal transmitted by the tag being reflected off various objects/surfaces between the tag and the reader, the correlation scheme ensures identification of the first observable transmission, which is the only signal containing valid timing information from which a true determination can be made of the distance from the tag to the reader.

Figure 7:
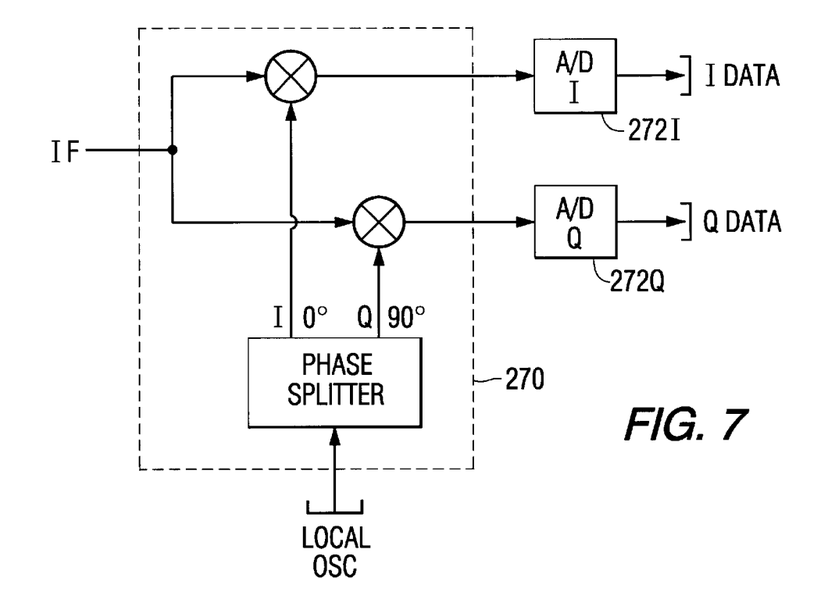
FIG. 7 diagrammatically illustrates IF-baseband down-converter and digitizer circuitry of a multi-channel digitizer of FIG. 6.

For this purpose, as shown in FIG. 6, the RF processor employs a front end, multi-channel digitizer 300, diagrammatically illustrated in FIG. 7 as comprising a quadrature IF-baseband down-converter 270 for each of an N number of the readers 10. The quadrature baseband signals are digitized by associated analog-to-digital converters (ADCs) 272I and 272Q. Digitizing (sampling) the reader outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components, so as to maximize performance and minimize cost.

This provides an advantage over bandpass filtering schemes, which require either higher sampling rates or more expensive ADCs that are capable of directly sampling very high IF frequencies and large bandwidths. Implementing a bandpass filtering approach would require a second ASIC to provide an interface between the ADCs and the correlators. In addition, baseband sampling requires only half the sampling rate per channel of bandpass filtering schemes.

The matched filter section 305 may contain a plurality of matched filter banks 307, each of which is comprised of a set of massive parallel correlators. This functional architecture of such a set of massive parallel correlators is diagrammatically shown in FIG. 8, as comprising a PN code generator 310, which produces a PN spreading code (identical to that produced by the PN spreading sequence generator 73 within the tag described above). In the functional signal flow architecture of FIG. 8, the PN spreading code produced by PN code generator is supplied to a first correlator unit 311-1 and a series of delay units 313-1, . . . , 313-N, outputs of which are coupled to respective ones of the remaining correlators 311-2, . . . , 311-N. Each delay unit 313-i provides a delay equivalent to one-half a chip.

Figure 8:
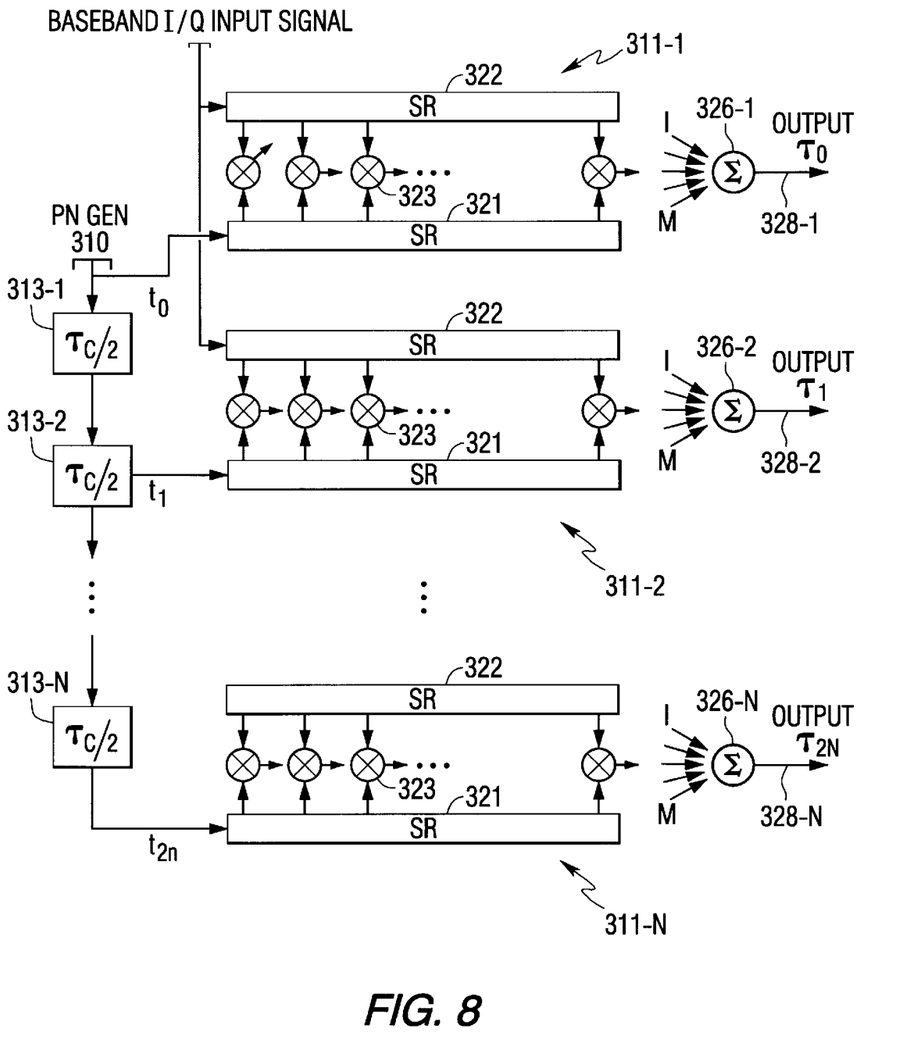
FIG. 8 diagrammatically illustrates the parallel correlator architecture of a matched filter bank of the correlation-based, RF signal processor of FIG. 6.

The functional architecture of a respective correlator unit 311 includes a first M stage shift register 321 (where M is the number of chips in the PN spreading sequence), through which a respective one of the successively delayed versions of the PN spreading sequence produced by PN generator 310 is clocked. The digitized reader baseband output signal is coupled to a second shift register 322 of each of the respective correlator units. The respective M stages of the first and second shift registers 321 and 322 of each correlator 311-i are applied to M respective multipliers of sets of multipliers 323. The M output products produced by the M multipliers 323 of the respective multiplier sets are summed in respective N summing units 326-1, . . . , 326-N, to produce N correlation values at correlator output ports 328-1, . . . , 328-N.

As a non-limiting example, the matched filter correlators may be sized and clocked to provide on the order of $4 \times 10^6$ correlations per epoch. By continuously correlating all possible phases of the PN spreading code with the incoming signal, the correlation processing architecture of FIG. 8 effectively functions as a matched filter, continuously looking for a match between the reference spreading code sequence and the contents of the incoming signal. Each correlation output port 328 is compared with a prescribed threshold that is adaptively established by a set of 'on-demand' or 'as needed' digital processing units 340-1, 340-2, . . . , 340-K of FIG. 6. That one of the correlator outputs 328 having a summation value exceeding the threshold identifies which delayed version of the PN spreading sequence is effectively aligned (to within half a chip time) with the incoming signal.

This signal is applied to a switching matrix 330, which is operative to couple a 'snapshot' of the data on the selected channel to a selected digital signal processing unit 340-i of the set of digital signal processing units 340. Since the tags will 'blink' or transmit randomly, and can be statistically quantified, the number of potential simultaneous signals over a processor revisit time will determine the number of such 'on-demand' digital signal processors required. Each processor scans the raw data supplied to the matched filter and the initial time tag. The raw data is scanned at fractions of a chip rate using a separate matched filter as a co-processor, so as to produce an autocorrelation in both the forward (in time) and backwards (in time) directions around the initial tag detection output for both the earliest (first observable path) detection and other buried signals. The output of the digital processor is the first path detection time tag, threshold information, and the amount of energy in the signal produced at each reader's input which is supplied to and processed by the time-of-arrival-based multi-lateration processor section 400.

Processor section 400 employs a standard multilateration algorithm that relies upon time-of-arrival inputs from at least three detectors to compute the location of the object. The algorithm may be one which uses a weighted average of the readers' received signals. In addition to using the first observable signals from the readers to determine object location, the processor also reads the data read out of the tag's memory and superimposed on the tag transmission. The object position and parameter data are then downloaded to a tag data base where object information is maintained.

Since the asset management database is separate and is arranged to be interfaced with the tracking system described above, the format of object data displayed by a processor linked to the asset management database may be readily customized for each user's application. Such a database may be maintained in a conventional personal computer, programmed to display both location and parameter data in a form customized for the user's application. As a non-limiting example, where the tag is used to track items in an industrial facility, the data may be displayed on a floor plan map of that facility in such a manner as to facilitate the user's assimilation of information relating to the items being tracked, such as equipment/part movement, employee activity, item orientation, temperature, vibration, emergency signalling, etc.

Figure 9:
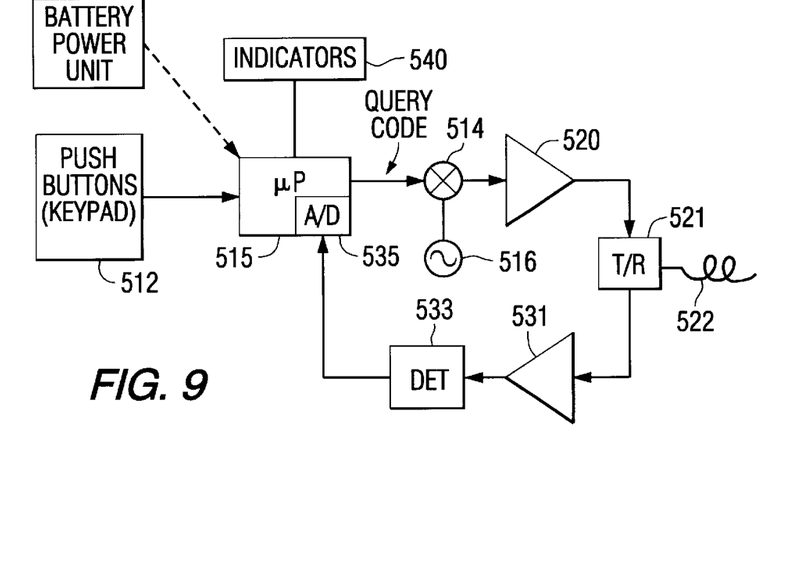
FIG. 9 illustrates the circuit architecture of an interrogator wand usable in the system of FIG. 1.

Since each tag possesses the ability to receive information, albeit limited, the content of its memory can be modified by the use of a (hand held, battery-powered) interrogator unit, such as a transceiver wand, pictorially illustrated at 30 in FIG. 1, and the circuit architecture for which is shown in FIG. 9. As shown therein the interrogator wand 30 includes a relatively low power, short range transmitter unit 510, that is selectively operative by the user to stimulate a queried tag to transmit its short duration spread spectrum energy burst, that is otherwise randomly generated on a relatively low repetition rate basis by the PN code generator 73 in the tag's transceiver unit, as described above with reference to FIG. 4.

Because it is relatively low power and has no significant processing gain, the interrogator wand 30 is intended to be used for only relatively short range queries (e.g., on the order of ten to fifteen feet). Its typical use is to more precisely pinpoint the location of a tagged object, whose location within the monitored environment, as determined by processor section 400, may fall within a resolution of ten feet or so. An example is an industrial facility, and the like, where a plurality of objects that are stored/distributed within a relatively confined physical plant, such as multiple storage bins distributed among multiple aisles of a parts storage warehouse. Where the object of interest is relatively small and is mixed in with a number of the same type of objects whose physical separation is closer than such coarse resolution, inventory personnel can take the interrogator wand to the initially identified area, and query the target object from that location.

Namely, the interrogator wand 30 must be reasonably close to the tag of interest, in order to stimulate a response, and thereby geographically refine the location of a tagged object, that has been initially located and tracked by virtue of its random, repetitive encoded spread spectrum emissions, described above. Thus, the low power emission from the interrogator wand 30 both prevents it from stimulating responses from a large number of tags, and allows the measurement of signal strength response to locate the proximity of the queried tag relative to the interrogating wand.

As shown in FIG. 9, the (battery powered) portable interrogator wand includes a mechanical user interface (keypad) 512, through which the user may program various information, such as that for identifying a particular tag and for altering the contents of the specified tag's memory, as described above. Keypad 512 is coupled to a control processor (microcontroller) 515, which generates a query code sequence that uniquely identifies one of the tags within the operating environment of the system. Such a code sequence may comprise a limited duration (e.g., on the order of one second) continuously repeating, Manchester encoded, sixty-four bit tag identification code with a Barker code preamble, having a pulse repetition rate of 100 Kps, as a non-limiting example.

By transmitting a continuously repetitive code over a duration on the order of more than one second ensures that the wand's interrogation stimulus will arrive at the queried tag during a time window within which a strobe pulse is generated by the strobe pulse generator 44 of FIG. 4, described above. As pointed out previously this strobe pulse, which is used to controllably enable the tag's low noise RF receiver amplifier circuit 50, is defined to ensure that any interrogation signal generated by the interrogation wand will be received and recovered by the tag's transceiver.

This query code sequence is coupled to a mixer 514, which modulates an RF carrier provided by an RF oscillator 516, such as one producing an output frequency on the order of 2.4 GHz, and thereby complying with FCC license exception requirement 15.249. The mixer 514 drives an amplifier 520 with a modulated RF carrier signal containing the address or identification of the tag transceiver of interest. The output of amplifier 520 is coupled to a transmit/receive switch 521, ported to an antenna 522, such as a unidirectional antenna to facilitate the location process, which emits a relatively low power RF signal for interrogating the particular tag identified by the query code sequence that has been accessed by a keyed input to the microcontroller 515.

Once the interrogation burst has been transmitted from the interrogator wand, the transmit/receive switch 521. reverts to the receive mode in anticipation of receiving a response spread spectrum energy burst from the queried tag of interest. As pointed out above, like a randomly 'blinked' transmission, this response message will include an identification of the tag and whatever parameter data is stored in the tag's memory. Any such response burst from the tag received by the interrogator wand is amplified by an amplifier 531 and applied to a relatively non-complex energy detector 533, such as a square law diode detector, the output of which is digitized (by an associated analog-to-digital converter 535) and coupled to microcontroller 515. By measuring the signal strength of the response signal, microcontroller is able to provide an indication of the proximity of the queried tag relative to the wand. For this purpose, the wand's microcontroller may also be coupled to provide a visual indication on an associated output display, such as an LCD display panel 540, which displays various parameter data associated with the operation of the wand and return data from the interrogated tag.

In the object tracking system described above, the multi-lateration algorithm executed by the processing section 400 locates a tagged object in terms of a common plane that presumably contains the readers and the object. In a practical asset management environment, such as a multi-storey building, however, the objects and the readers may be located in a variety of different planes. To accommodate this practical reality, the data stored in a respective tag memory (shown at 110 in FIG. 4) may be augmented by altimetry data supplied from a relatively inexpensive, commercially available altimeter circuit, as diagrammatically illustrated at 600 in FIG. 10.

Figure 10:
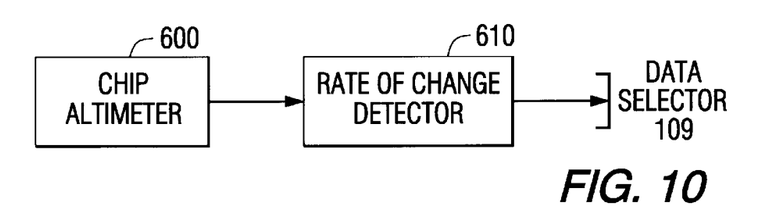
FIG. 10 diagrammatically illustrates an altimeter and rate of change detector, which may couple auxiliary elevation data to the tag memory.

Although the absolute accuracy of such a circuit may not be sufficient to determine altitude to within a few feet relative to sea level, by coupling its output to a rate of change detector circuit 610 as a further sensor input to tag memory, the tag is able to store data representative of whether the elevation of the tag has increased or decreased over some period of time (as define by the rate of change circuit 610). This allows the tag memory 110 to keep a running count representative of the current elevation of the tag referenced to a starting point, when the tag was initially place in service with an object being tracked.

Multi-storey buildings are generally accessed through stairwells and elevators. Because the object tracking system has the capability of determining the location of a tag to an accuracy of only a few feet, it can provide an indication of a floor change, if a reader is situated in the immediate area through which the tag is transported. For this purpose, as diagrammatically in FIG. 11, a reader 620 positioned in the vicinity of an elevation change region (e.g., portal or stairwell) 630 may be augmented with an interrogating emitter, such as that used in the interrogating wand described above.

Figure 11:
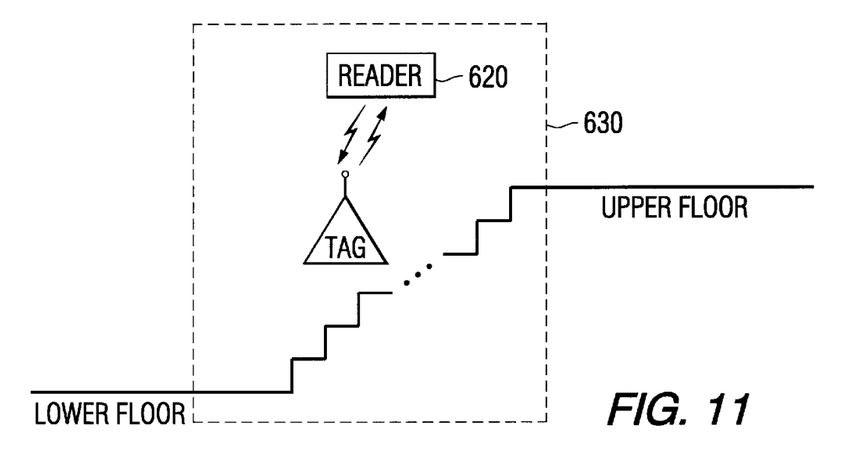
FIG. 11 diagrammatically illustrates an interrogating reader positioned in the vicinity of an elevation change region (stairwell) for detecting if the elevation of the tag is increasing or decreasing as the tag is travelling through the elevation change region.

Such an interrogating emitter is operative to cause a tag in the elevation change region 630 to transmit at a relatively high frequency (e.g., once per second), so as to allow the reader to determine, from the altimeter data in successive ones of the tag's data bursts, if the elevation of the tag is increasing or decreasing as the tag is travelling along the stairway. In the case of a multi-storey building, it may thus be determined whether the object to which the tag is affixed has been transported up or down some number of floors.

Now although the matched filter correlation geolocation system described above is very effective to ensure identification of the first observable transmission from a tag in the presence of multiple signals, such multipath signals may destructively combine at one or more readers, causing fades and nulls and thereby prevent an accurate determination of the location of the object. It may be recalled that the objective of the reader processor is to determine the earliest to arrive signal (which is always the best, albeit not perfect) indicator of range, since the first-to-arrive signal follows the most direct path from the tag to the reader.

SUMMARY OF THE INVENTION

In accordance with the present invention, this potential multipath-based reduction in the energy of the direct path signal from the tag to a reader is effectively obviated by augmenting the above-described geolocation system with auxiliary, spatial diversity-based receiver-processing paths, that are effective to aggressively mitigate against the effects of multipath interference.

Pursuant to a first embodiment of the invention, rather than employ a single RF signal processing path for each reader location, a plurality of tag readers are installed at each monitoring location, and associated signal processing paths are coupled therefrom to a triangulation processor. RF front ends of the tag readers include respective antennas which feed RF signal processing circuits. To provide spatial diversity-based mitigation of multipath signals, the antennas of each reader site are spaced apart from one another by a distance that is sufficient to effectively statistically minimize destructive multipath interference at both antennas simultaneously, and also ensure that the antennas are close enough to one another so as to not significantly affect the calculation of the location of the object by the downstream multi-lateration processor.

The multi-lateration algorithm executed by the object location processor is modified to include a front end subroutine that selects the earlier-to-arrive outputs of each of the detector pairs as the value to be employed in the multi-lateration algorithm. Because of the use of spatial diversity, there is an extremely high probability (e.g., a likelihood on the order of ninety percent or greater) that at least one of the two readers at any given reader location will provide a first-to-arrive output value to the processor for any tag emission.

In accordance with a modification of the embodiment, for each tag reader location, a plurality of auxiliary 'phased array' signal processing paths are coupled to the tag reader's antenna set (e.g., pair), in addition to the paths containing the directly connected readers and their associated first arrival detector units that feed the triangulation geometry processor. Each respective auxiliary phased array path is configured to sum the energy received from the two antennas in a pre-scribed phase relationship, with the energy sum being coupled to associated readers and detector units that feed the triangulation processor.

The purpose of this phased array modification is to address the situation in a multipath environment where a relatively 'early' signal may be canceled by an equal and opposite signal arriving from a different direction. The second embodiment takes advantage of the array factor of a plurality of antennas to provide a reasonable probability of effectively ignoring the destructively interfering energy. The phased array provides each reader site with the ability to differentiate between received signals, by using the 'pattern' or spatial distribution of gain to receive one incoming signal and ignore the other.

Similar to the first embodiment, but for a respective reader location, the multi-lateration algorithm executed by the triangulation processor includes a front end subroutine that selects the earliest-to-arrive output of its input signal processing paths from the detector pairs and those from each of the signal processing paths as the value to be employed in the multi-lateration algorithm (for that reader site). The number of elements and paths, and the gain and the phase shift values (weighting coefficients) may be varied depending upon the application.

DETAILED DESCRIPTION

Before detailing the architecture and operation of the spatial diversity-based receiver-processing path improvement to the spread spectrum correlation-based, tagged object location system of the '232 application, described above with reference to FIGS. 1–11, it should be observed that the invention resides primarily in an arrangement of conventional communication circuits and associated digital signal processing components and attendant supervisory control circuitry therefor, that controls the operations of such circuits and components. The configuration of such circuits components and the manner in which they interface with other communication system equipment have, therefore, been illustrated in readily understandable block diagram format, depicting details that are pertinent to the present invention, so as not to obscure the disclosure with details which will be readily apparent to those skilled in the art having the benefit of the description herein. Thus, the block diagram illustrations of FIGS. 12 and 13 are primarily intended to show the major components of the system in a convenient functional grouping, whereby the present invention may be more readily understood.

As described briefly above, the present invention obviates multipath-based fades and nulls in the monitoring of direct path signals from a tag to various ones of the readers distributed around an object management environment of the geolocation system of the '232 application, by means of auxiliary, spatial diversity-based receiver-processing paths associated with each reader. Pursuant to a first embodiment of the invention, diagrammatically illustrated in FIG. 12, rather than employ a single RF signal processing path for each reader location, a plurality of readers (e.g., two readers) are installed at each monitoring location, and associated signal processing paths are coupled therefrom to the triangulation processor (e.g., processor 400 of FIG. 6).

Figure 12:
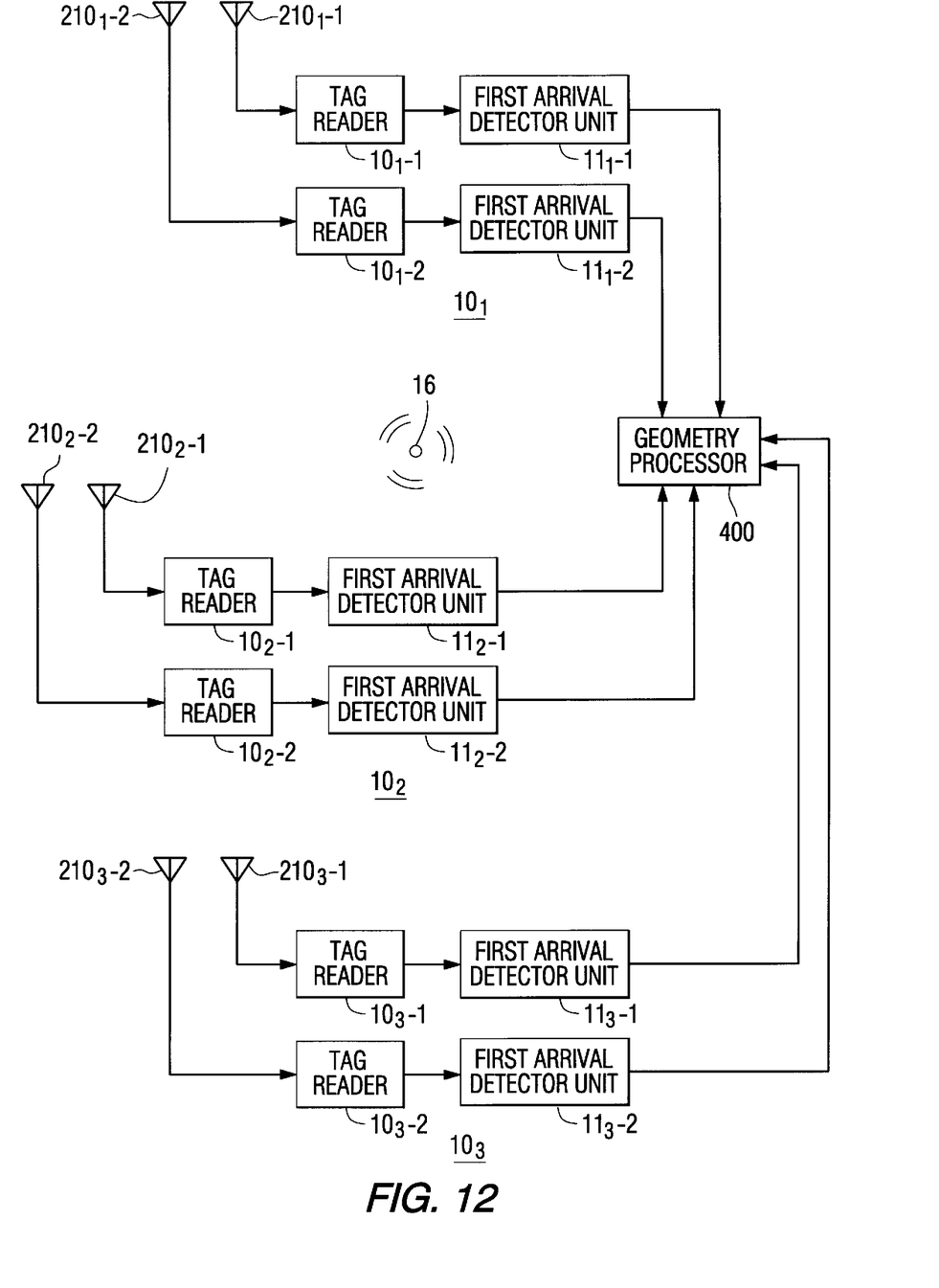
FIG. 12 diagrammatically illustrates a first embodiment of a modification of the tagged object tracking and location system of FIGS. 1–11, that employs spatial diversity based first wave-front arrival determination.
Figure 13:
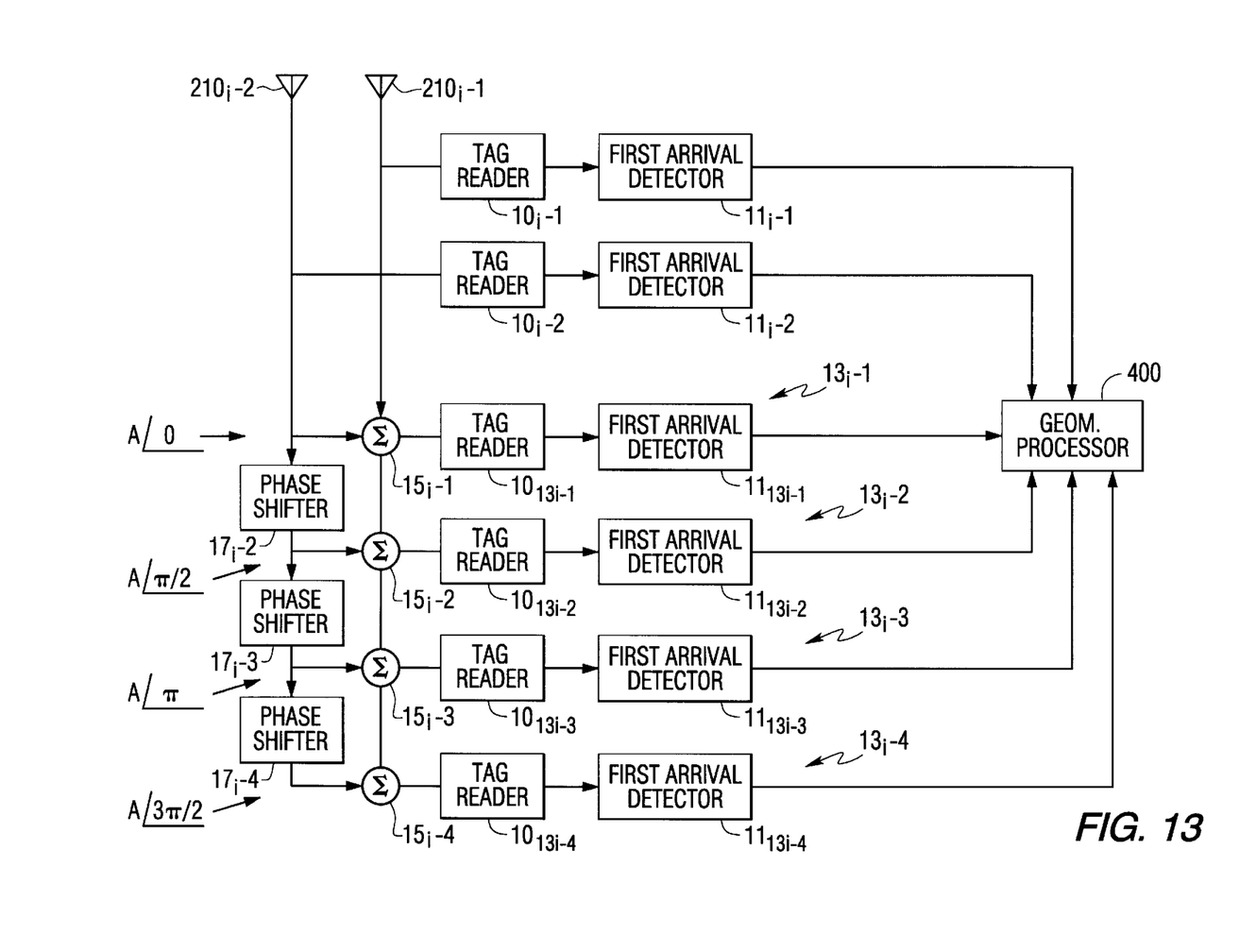
FIG. 13 diagrammatically illustrates a second embodiment of a modification of the tagged object tracking and location system of FIGS. 1–11, that employs spatial diversity based first wave-front arrival determination.

More particularly, FIG. 12 diagrammatically shows a non-limiting example of an object management environment containing one or more randomly 'blinking' tags 16, RF emissions from which are receivable at a plurality of geographically distributed monitoring locations, three of which are shown at $10_1$, $10_2$, $10_3$. In accordance with the first embodiment, monitoring location $10_1$ has first and second tag readers $10_1$-1 and $10_1$-2, whose respective output signal processing paths contain the matched filter correlation processing components described above with reference to FIG. 6. These signal processing paths are identified in FIG. 12 as first arrival detector units $11_1$-1 and $11_1$-2. The outputs of the first arrival detector units $11_1$-1 and $11_1$-2 are coupled to triangulation geometry processor 400.

The RF front ends of the tag readers $10_1$-1 and $10_1$-2 comprise respective antennas $210_1$-1 and $210_1$-2, which feed RF signal processing circuits described with reference to FIG. 5. In order to provide spatial diversity-based mitigation of multipath signals, antennas $210_1$-1 and $210_2$-1 are spaced apart from one another by a distance that is sufficient to effectively statistically minimize destructive multipath interference at both antennas simultaneously. In conformance with accepted radio communication engineering practice, in order to make the probability of a fade at each antenna statistically independent of each other, the spacing between antennas $210_1$-1 and $210_2$-1 is preferably on the order of several (e.g., four to five) wavelengths of the RF carrier. This several wavelength spacing at the RF frequency of interest also ensures that the antennas are close enough to one another to not significantly affect the calculation of the location of the object by the downstream multi-lateration processor 400.

Although the previous description of FIG. 5 states that a single reader antenna is preferably omni-directional and circularly polarized, in the present embodiment, where two or more antennas (and associated reader signal processing paths) are employed at each reader location, additional mitigation of multipath may realized by incorporating configuration and/or sensitivity diversity into the antennas, such as by using orthogonally polarized antennas. From a practical (hardware and cost) standpoint, spatial diversity pairing of two antennas per reader location is preferred, as it statistically ensures (provides a very high probability (on the order of ninety percent or greater) that at least one of the two readers at any given reader location will provide a first-to-arrive output value to the processor for any tag emission.

For the other two monitoring locations of FIG. 12, monitoring location $10_2$ has first and second spatially diverse antennas $210_2$-1 and $210_1$-2, which feed tag readers $10_2$-1 and $10_2$-2, whose outputs are coupled by way of first arrival detector units $11_2$-1 and $11_2$-2 to triangulation geometry processor 400. Similarly, monitoring location $10_3$ has first and second spatially diverse antennas $210_3$-1 and $210_3$-2, which feed tag readers $10_2$-1 and $10_2$-2, coupled to tag readers $10_3$-1 and $10_3$-2, the outputs of which are coupled by way of first arrival detector units $11_3$-1 and $11_3$-2 to triangulation geometry processor 400.

As described above, processor section 400 employs a standard multi-lateration algorithm that relies upon time-of-arrival inputs from at least three detectors (in the example of FIG. 12, three detector unit pairs $11_1$-1/$11_1$-2; $11_2$-1/$11_2$-2; and $11_3$-1/$11_3$-2) to compute the location of the object. In accordance with the spatial diversity based enhancement of the embodiment of FIG. 12, the multi-lateration algorithm executed by processor 400 is modified to include a front end subroutine that selects the earlier-to-arrive outputs of the detector pairs $11_1$-1/$11_1$-2; $11_2$-1/$11_2$-2; and $11_3$-1/$11_3$-2, as the value to be employed in the multi-lateration algorithm. As noted above, because of the use of spatial diversity in the enhance d system architecture of FIG. 12, there is an extremely high probability (e.g. , a likelihood on the order of ninety percent or greater) that at least one of the two readers $10_i$-1 and $10_i$-2 at any given reader location $10_i$ will provide a first-to-arrive output value to the processor 400 for any tag emission.

FIG. 13 diagrammatically shows a modification of the embodiment of FIG. 12, in which a plurality of auxiliary 'phased array' signal processing paths (four of which are shown at $13_i$-1, $13_i$-2, $13_i$-3 and $13_i$-4) are coupled to the antenna pair $210_i$-i and $210_i$-2, in addition to the paths containing the readers $10_i$-i, $10_i$-2, and their associated first arrival detector units $11_i$-1 and $11_i$-2 that feed the triangulation geometry processor 400. Each respective phased array path $13_i$-j is configured to sum the energy received from the two antennas in a prescribed phase relationship, with the energy sum being coupled to associated readers and detector units that feed processor 400.

The purpose of this arrangement is to address the situation in a multipath environment where a relatively 'early' signal may be canceled by an equal and opposite signal arriving from a different direction. The embodiment of FIG. 13 takes advantage of the array factor of a plurality of antennas to provide a reasonable probability of effectively ignoring the destructively interfering energy. Namely, the use of a relatively small numbered phased array (e.g., one having four phase shift paths, as cost effective) provides each reader site with the ability to differentiate between received signals, by using the 'pattern' or spatial distribution of gain to receive one incoming signal and ignore the other.

In the embodiment of FIG. 13, a first (0° relative shift) phased array signal processing path $13_i$-1 directly couples the outputs of antenna elements $210_i$-1 and $210_i$i-2, without imparting any relative phase shift therebetween, to inputs of a summation unit $15_i$-i. The summed output of summation unit $15_i$-i is coupled to a respective reader $10_{13i-1}$, the output of which is processed in a first arrival detector unit $11_{13i-1}$, which feeds processor 400.

The second (90° relative phase shift) signal processing path $13_i$-2 couples the output of antenna element $210_i$-a through a 90° phase shifter $17_i$-2 to a first input of summation unit $15_i$-2. The output of antenna element $210_i$-2 is coupled directly to a second input of summation unit $15_i$-2. The summed output of summation unit $15_i$-2 is coupled to a respective reader $10_{13i-2}$, the output of which is processed in a first arrival detector unit $11_{13i-2}$, which feeds processor 400.

Similarly, the third (180° relative phase shift) signal processing path $13_i$-3 couples the output of antenna element $210_i$-i through a 180° phase shifter $17_i$-3 to a first input of summation unit $15_i$-3. The output of antenna element $210_i$-2 is coupled directly to a second input of summation unit $15_i$-3. The summed output of summation unit $15_i$-3 is coupled to a respective reader $10_{13i-3}$, the output of which is processed in a first arrival detector unit $11_{13i-3}$, which feeds processor 400.

A fourth (−90° relative phase shift) signal processing path $13_i$-4 couples the output of antenna element $210_i$-1 through a −90° phase shifter $17_i$-4 to a first input of summation unit $15_i$-4. The output of antenna element $210_i$-2 is coupled directly to a second input of summation unit $15_i$-4. The summed output of summation unit $15_i$-4 is coupled to a respective reader $10_{13i-4}$, the output of which is processed in a first arrival detector unit $11_{13i-4}$, which feeds processor 400.

Similar to the embodiment of FIG. 12, but for a respective reader location, the multi-lateration algorithm executed by processor 400 is modified to include a front end subroutine that selects the earliest-to-arrive output of its input signal processing paths from the detector pairs $11_1$-1/$11_1$-2 and those from each of the signal processing paths $13_i$-1, $13_i$-2, $13_i$-3 and $13_i$-4 as the value to be employed in the multi-lateration algorithm (for that reader site).

Although the embodiment of FIG. 13 contains four (ninety degree differential) phase shift paths as a non-limiting example, it should be realized that this embodiment is not limited to a specific number of signal processing paths or relative phase shift offsets between antenna outputs. Nor is this embodiment limited to use with only two antennas. The number of elements and paths, as well as weighting coefficients (gain and phase shift values) may be varied depending upon the application.

Because each signal processing path employs the time invariant matched filter correlation processing, described above, it will be realized that the relatively reduced complexity example given here provides a practical implementation of an overall system, that does not entail an excessive cost burden to the budget of an industrial facility. In a multiple signal processing path array, especially a large numbered array, the phase shifts and gains (phased array weighting coefficients) of each signal processing path may be readily optimized using standard coefficient adjustment algorithms employed in the communications industry, to realize an overall array processing configuration, that is optimized for earliest path detection.

As will be appreciated from the foregoing description, the potential for multipath-based reduction in received energy of a direct path signal from a transmitting tag to a reader in a geolocation system, such as that described in the above-referenced '232 application, is effectively obviated in accordance with the present invention by augmenting each reader location with at least one auxiliary receiver-processing path. Each auxiliary receiver-processing paths antenna is spaced apart from another reader's antenna at that location by a distance that is sufficient to effectively statistically minimize destructive multipath interference at both antennas simultaneously, by close enough to not significantly affect the calculation of the location of the object by the downstream multi-lateration processor, that selects the earlier-to-arrive output of the plural receiver-processing paths for that monitoring location.

As a further feature, each augmented tag reader location may couple a plurality of auxiliary 'phased array' signal processing paths to the tag reader's antennas. The phased array provides each reader site with the ability to differentiate between received signals, by using the 'pattern' or spatial distribution of gain to receive one incoming signal and ignore the other.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A system for identifying the locations of objects within a monitored environment, using time-of-arrival differentiation for transmissions from tags disposed with said objects, as detected at a plurality of spaced apart tag transmission monitoring locations for said monitored environment comprising:

for each of said objects, a respective tag disposed therewith containing a tag transmitter which is operative to transmit a signal encoded with information representative of the identification of said each object;

each of said plurality of spaced apart tag transmission monitoring locations having a plurality of mutually diverse antennas coupled to associated tag transmission readers which are operative to detect said signals transmitted by said tag transmitter;

reader output processors operative to process signals detected by associated tag transmission readers and to determine which signals received by said tag transmission readers are first-to-arrive signals as transmitted from said tag transmitter; and an object location processor coupled to said reader output processors, and being operative to carry out time-of-arrival differentiation of said first-to-arrive signals transmitted from said tag transmitter as detected by said plurality of tag transmission readers, so to locate said object within said environment.

2. A system according to claim 1, wherein said tag transmitter is operative to transmit said encoded signal in a random and repetitive manner that does not depend upon whether said object is in motion or is stationary.

3. A system according to claim 1, wherein said object location processor is operative to carry out said time-of-arrival differentiation of earliest-in-time ones of first-to-arrive signals detected by tag transmission readers of each of said monitoring locations.

4. A system according to claim 1, wherein said signals comprise spread spectrum RF signals, and wherein a respective reader processor comprises a matched filter correlator having a plurality of matched filter banks containing parallel correlators, which are operative to correlate a received spread spectrum RF signal with successive time offset versions of a reference spreading code corresponding to that of said spread spectrum RF signals.

5. A system according to claim 1, wherein said mutually diverse antennas of a respective monitoring location comprise spatially diverse antennas, that are spaced apart from one another by a distance sufficient to effectively statistically minimize destructive multipath interference at said antennas simultaneously, and wherein said antennas are spaced close enough to one another as to not significantly affect determination of the location of said object within said environment by said object location processor.

6. A system according to claim 1, further including, at each monitoring location, a plurality of auxiliary 'phased array' signal processing paths coupled to said mutually diverse antennas to which said associated tag transmission readers are coupled, and wherein each auxiliary phased array path is configured to sum energy received from said antennas in a prescribed phase relationship, and to couple a respective energy sum to an associated tag transmission reader, and wherein a further reader output processor is coupled to said associated tag transmission readers, and is operative to process the energy sum supplied to said associated tag transmission reader and to generate a further first-to-arrive signal, and wherein said object location processor is operative to carry out time-of-arrival differentiation of earliest-in-time ones of signals provided by said tag transmission readers.

7. A method for identifying locations of objects within a monitored environment, using time-of-arrival differentiation for a transmission from a tag disposed with one of said objects, as detected at a plurality of spaced apart tag transmission monitoring locations for said monitored environment comprising the steps of:

(a) transmitting from a tag transmitter coupled with a respective one of said objects a signal encoded with information representative of the identification of said object;

(b) at each of said plurality of spaced apart tag transmission monitoring locations, receiving said signal at a plurality of mutually diverse antennas;

(c) coupling signals received by said plurality of mutually diverse antennas to associated tag transmission readers which are operative to detect said signal transmitted by said tag transmitter;

(d) processing signals detected by said tag transmission readers and determine which signals received by said tag transmission readers are first-to-arrive signals as transmitted from said tag transmitter; and (e) conducting time-of-arrival differentiation processing of said first-to-arrive signals to locate said respective object within said environment.

8. A method according to claim 7, wherein said tag transmitter is operative to transmit said encoded signal in a random and repetitive manner that does not depend upon whether said object is in motion or is stationary.

9. A method according to claim 7, wherein step (e) comprises conducting said time-of-arrival differentiation of earliest-in-time ones of first-to-arrive signals detected by tag transmission readers of each of said monitoring locations.

10. A method according to claim 7, wherein said signals comprise spread spectrum RF signals, and wherein step (d) comprises correlating a received spread spectrum RF signal with successive time offset versions of a reference spreading code corresponding to that of said transmitted spread spectrum RF signals.

11. A method according to claim 7, wherein said mutually diverse antennas of a respective monitoring location comprise spatially diverse antennas, that are spaced apart from one another by a distance sufficient to effectively statistically minimize destructive multipath interference at said antennas simultaneously, and wherein said antennas are spaced close enough to one another as to not significantly affect determination of the location of said respective tag and its associated object within said environment.

12. A method according to claim 7, wherein step (c) further comprises coupling a plurality of auxiliary 'phased array' signal processing paths to said mutually diverse antennas, summing energy received from said antennas in a prescribed phase relationship, and coupling a respective energy sum to an associated tag transmission reader, step (d) further comprises processing the energy sum supplied to said associated tag transmission reader, and generating a further first-to-arrive signal, and step (e) further comprises conducting said time-of-arrival differentiation to includes said further earliest-in-time ones of signals.

* * * * *